United States Patent Office 3,793,328
Patented Feb. 19, 1974

3,793,328
8 BENZOYL 1,2,3,4 TETRAHYDROQUINOLINE
Jackson B. Hester, Jr., Portage, Mich., assignor to The Upjohn Company, Kalamazoo, Mich.
No Drawing. Original application Nov. 3, 1969, Ser. No. 873,719, now Patent No. 3,714,149, dated Jan. 30, 1973. Divided and this application Feb. 8, 1971, Ser. No. 113,760
Int. Cl. C07d 33/10
U.S. Cl. 260—286 R          1 Claim

ABSTRACT OF THE DISCLOSURE 1,2 - dihydro - 8 - phenyl - 3H - pyrido[3,2,1-jk][1,4]-benzodiazepin-5(6H)-ones, processes for preparing the same and intermediates prepared by said processes. The novel compounds of this invention exhibit tranquilizing and anticonvulsant activity in animals.

This is a division of application Ser. No. 873,719, filed Nov. 3, 1969, now issued as U.S. Pat. No. 3,714,149.

BRIEF SUMMARY OF THE INVENTION

This invention relates to novel 1,2-dihydro-8-phenyl-3H-pyrido[3,2,1-jk][1,4]benzodiazepin-5(6H)-ones, processes for preparing the same and intermediates prepared by said processes. The novel 1,2-dihydro-8-phenyl-3H-pyrido[3,2,1-jk][1,4]benzodiazepin-5(6H)-ones of the invention have the formula

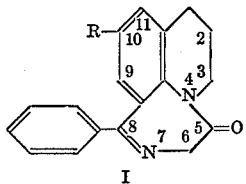

I wherein R is selected from the group consisting of hydrogen, alkyl of from 1 to 3 carbon atoms, inclusive, alkoxy of from 1 to 3 carbon atoms, inclusive, bromo, chloro and fluoro. The term "novel compounds" of this invention, as used throughout the specification also embraces the acid addition salts of the compounds of Formula I.

The term alkyl is inclusive of methyl, ethyl, propyl and isopropyl. The term alkoxy is inclusive of methoxy, ethoxy, propoxy and isopropoxy.

The novel intermediates of this invention have the formula

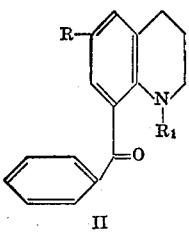

II wherein R is the same as above and $R_1$ is selected from the group consisting of hydrogen, acetyl and bromoacetyl.

The novel compounds of the invention can be prepared by the process represented by the following equations:

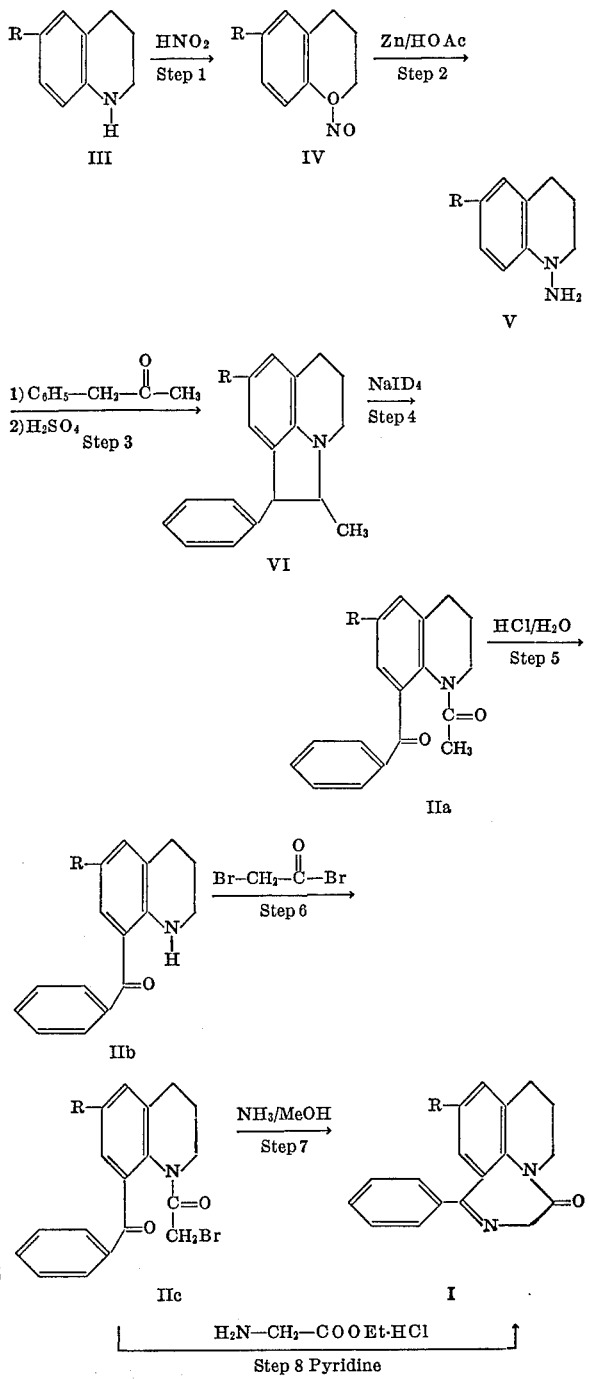

wherein R is the same as above.

DETAILED DESCRIPTION

Step 1 of the above process is carried out by treating a solution of the appropriate 1,2,3,4-tetrahydroquinoline (III) in dilute aqueous sulfuric acid with an aqueous solution of sodium nitrite. Step 2 is carried out by treating a stirred mixture of the 1-nitroso-1,2,3,4-tetrahydroquinoline (IV), methanol and zinc dust with acetic acid to yield V. Step 3 involves refluxing a solution of the 1-amino-1,2,3,4-tetrahydroquinoline (V), phenylacetone and acetic acid in benzene with azeotropic distillation of water, concentrating the resulting solution and heating the residue in 2M ethanolic sulfuric acid to yield a 5,6-dihydro-2-methyl-1-phenyl-4H-pyrrolo[3,2,1-ij]quinoline (VI). The conditions utilized in these three steps are described in considerable detail by Kost et al., J. Gen. Chem., 29, 1920 and 3937 (1959).

In step 4, a stirred mixture of the 5,6-dihydro-2-methyl-1-phenyl-4H-pyrrolo[3,2,1-ij]quinoline (VI), water, dioxane and sodium metaperiodate is kept at 50–70° C. for 18–36 hours. The mixture is then poured into water and the product extracted with a suitable organic solvent such as methylene chloride, chloroform or ether to give a 1-acetyl-8-benzoyl-1,2,3,4-tetrahydroquinoline (IIa).

In step 5, a mixture of IIa, 6 N hydrochloric acid and ethanol is refluxed for 10–24 hours to yield an 8-benzoyl-1,2,3,4-tetrahydroquinoline (IIb).

In step 6, a solution of IIb and an acid acceptor such as pyridine or triethylamine in benzene or ether is treated at ambient temperature with bromoacetyl bromide and allowed to stand for 1–5 hours to give an 8-benzoyl-1-bromoacetyl-1,2,3,4-tetrahydroquinoline (IIc).

In step 7, IIc is dissolved in a solution of anhydrous ammonia in methanol. This solution is allowed to stand at about 25° C. for 5–18 hours to yield a 1,2-dihydro-8-phenyl-3H - pyrido-[3.2,1-jk][1,4]benzodiazepin - 5(6H)-one (1). The product is recovered from the reaction mixture by conventional procedures such as crystallization, evaporation, chromatography and combinations thereof.

In step 8, a solution of IIb and ethyl glycinate hydrochloride in dry pyridine is refluxed for 8–24 hours. During the first few hours of the reaction the ethanol-water-pyridine azeotrope is slowly distilled from the mixture. The product (1) is recovered from the reaction mixture by conventional procedures such as crystallization, evaporation, chromatography and combinations thereof.

The acid addition salts of the invention comprise the salts of the compounds of Formula I and the compounds of Formula II wherein $R_1$ is hydrogen with pharmacologically acceptable acids such as sulfuric, hydrochloric, nitric, phosphoric, lactic, benzoic, methanesulfonic, p-toluenesulfonic, salicylic, acetic, propionic, maleic, malic, tartaric, citric, cyclohexanesulfamic, succinic, nicotinic, ascorbic acids, and the like.

The novel compounds and intermediates of this invention exhibit tranquilizing and anticonvulsant activity. These activities were evaluated by use of the following tests.

Chimney test [Med. Exp. 4, 11 (1961)]

This test determines the ability of mice to back up and out of a vertical glass cylinder within 30 seconds. Failure of mice to back up and out within this time indicates tranquilization.

Dish test

Mice in Petri dishes (10 cm. diameter, 5 cm. high, partially embedded in wood shavings) climb out in a very short time, when not treated. Mice remaining in the dish for more than 3 minutes indicates tranquilization.

Pedestal test

Mouse is placed on a pedestal. The untreated mouse leaves the pedestal in less than a minute to climb back to the floor of the standard mouse box. Tranquilized mice will stay more than 1 minute.

Nicotine antagonism test

Thirty minutes after mice in a group are treated with the test compound, both the treated and untreated mice are injected with 2 mg./kg. of nicotine salicylate. The untreated mice show overstimulation, i.e., (1) running convulsions followed by (2) tonic extensor fits, followed by (3) death. An effective nicotine antagonist will protect the treated mice against (2) and (3).

The results of the above tests utilizing some of the novel compounds of this invention (administered intraperitoneally) are set forth in the following table. The results are expressed in terms of the mg./kg. dosage at which the tested compounds exhibited the activity in 50% of the mice ($ED_{50}$).

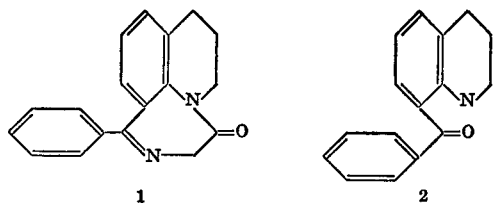

| Compound | 1 | 2 |
|---|---|---|
| Test: | | |
| Chimney | >200 | 159 |
| Dish | 50 | 89 |
| Pedestal | 142 | 142 |
| N.A.:[1] | | |
| TE [2] | 12.5 | |
| D [3] | 12.5 | |

[1] N.A.=Nicotine antagonism.
[2] TE=Tonic extensor fits.
[3] D=Death.

For purposes of administration to birds and to mammals, including animals of economic value such as horses, cattle, sheep, pigs, mice, rats, rabbits and the like, the novel compounds of the invention can be combined with solid or liquid pharmaceutical carriers and formulated in the form of tablets, powder packets, capsules and the like solid dosage forms, using starch and like excipients, or dissolved in suitable solvents or vehicles for oral or parenteral administration.

Also, for mammals and birds food premixes, with starch, oatmeal, dried fishmeat, fishmeal, flour and the like can be prepared.

The novel compounds of this invention having the Formula I and the Formula II wherein $R_1$ is hydrogen also form thiocyanic acid addition salts which when condensed with formaldehyde, form resinous materials useful as pickling inhibitors according to U.S. Pats. 2,425,320 and 2,606,155. The fluosilicic acid addition salts are useful as mothproofing agents according to U.S. Pats. 1,915,334 and 2,075,359.

The following examples are set forth to illustrate my invention and to enable persons skilled in the art to better understand and practice the invention and are not intended to limit the same.

EXAMPLE 1

1-acetyl-8-benzoyl-1,2,3,4-tetrahydroquinoline

A stirred mixture of 49.4 gm. (0.20 mole) of 5,6-dihydro-2 - methyl-1-phenyl-4H-pyrrolo[3,2,1-ij]quinoline, 106.4 gm. (0.50 mole) of sodium metaperiodate, 2000 ml. of dioxane and 570 ml. of water is heated under a nitrogen atmosphere at 60° C. for 20 hours and poured into water. This mixture is extracted with chloroform. The chloroform extract is washed with water, dried over magnesium sulfate and concentrated in vacuo. The residue is chromatographed on 3.5 kg. of silica gel with 75% ethyl acetate-25% cyclohexane (by volume); 250-ml. fractions are collected. The material eluted in fractions 60–90 is crystallized from ethyl acetate to give 25.6 gm. (46% yield) of crude product. This product is recrystallized from ethyl acetate to yield 1-acetyl-8-benzoyl-1,2,3,4-tetrahydroquinoline, melting point 132–133.5° C.

*Analysis.*—Calcd. for C$_{18}$N$_{17}$NO$_2$ (Percent): C, 77.39; H, 6.13; N, 5.01. Found (percent): C, 77.47; H, 6.46; N, 4.95.

Using the procedure of Example 1, but replacing 5,6-dihydro-2-methyl-1-phenyl - 4H - pyrrolo[3,2,1-ij]quinoline by the appropriately substituted 5,6-dihydro-2-methyl-1-phenyl-4H-pyrrolo[3,2,1-ij]quinoline is productive of the corresponding 1 - acetyl-8-benzoyl-1,2,3,4-tetrahydroquinoline. Representative of the 1-acetyl-8-benzoyl-1,2,3,4-tetrahydroquinolines so obtained are:

1-acetyl-8-benzoyl-6-methyl-
1-acetyl-8-benzoyl-6-ethyl-
1-acetyl-8-benzoyl-6-methoxy-
1-acetyl-8-benzoyl-6-ethoxy-
1-acetyl-8-benzoyl-6-chloro- and
1-acetyl-8-benzoyl-6-bromo-1,2,3,4-tetrahydroquinoline.

EXAMPLE 2

8-benzoyl-1,2,3,4-tetrahydroquinoline

A stirred mixture of 23.4 gm. (0.0837 mole) of 1-acetyl-8-benzoyl - 1,2,3,4 - tetrahydroquinoline (Example 1), 595 ml. of ethanol and 300 ml. of 6 N hydrochloric acid is refluxed for 10 hours and allowed to stand at ambient temperature for 18 hours. This mixture is concentrated to about 300 ml. under reduced pressure and poured into water. This solution is cooled in an ice bath, made alkaline with sodium hydroxide and extracted with ether. The ether extract is dried over anhydrous potassium carbonate and concentrated under reduced pressure. The residue is crystallized from petroleum ether to give 17.6 gm. (88.9% yield) of crude product. This product is recrystallized from petroleum ether to yield 8-benzoyl-1,2,3,4-tetrahydroquinoline, melting point 68–69.5° C.

*Analysis.*—Calcd. for C$_{16}$H$_{15}$NO (percent): C, 80.98; H, 6.37; N, 5.90. Found (percent): C, 81.05; H, 6.77; N, 5.88.

Using the procedure of Example 2, but replacing 1-acetyl-8-benzoyl-1,2,3,4-tetrahydroquinoline by the appropriately substituted 1 - acetyl-8-benzoyl-1,2,3,4-tetrahydroquinoline is productive of the corresponding 8-benzoyl-1,2,3,4-tetrahydroquinoline. Representative of the 8-benzoyl-1,2,3,4-tetrahydroquinolines so obtained are:

8-benzoyl-6-methyl-
8-benzoyl-6-ethyl-
8-benzoyl-6-methoxy-
8-benzoyl-6-ethoxy-
8-benzoyl-6-chloro- and
8-benzoyl-6-bromo-1,2,3,4-tetrahydroquinoline.

EXAMPLE 3

8-benzoyl-1-bromoacetyl-1,2,3,4-tetrahydroquinoline

A stirred solution of 1.0 gm. (4.22 millimoles) of 8-benzoyl-1,2,3,4-tetrahydroquinoline (Example 2) and 0.4 ml. of pyridine in 85 ml. of ether is treated with 1.02 gm. (5.06 millimoles) of bromoacetyl bromide and kept at ambient temperature for 2.5 hours. The ether solution is then washed with water, dried over potassium carbonate and concentrated in vacuo. The residue is chromatographed on 100 gm. of silica gel with 40 ethyl acetate-60% cyclohexane (by volume); 40-ml. fractions are collected. The product, 8-benzoyl-1-bromoacetyl-1,2,3,4-tetrahydroquinoline (0.525 gm.) in the form of an oil, is eluted in fractions 5–10.

Using the procedure of Example 3, but replacing 8-benzoyl-1,2,3,4-tetrahydroquinoline by the appropriately substituted 8-benzoyl-1,2,3,4-tetrahydroquinoline is productive of the corresponding 8-benzoyl-1-bromoacetyl-1,2,3,4-tetrahydroquinoline. Representative of the 8-benzoyl-1-bromoacetyl-1,2,3,4-tetrahydroquinolines so obtained are:

8-benzoyl-1-bromoacetyl-6-methyl-
8-benzoyl-1-bromoacetyl-6-ethyl-
8-benzoyl-1-bromoacetyl-6-methoxy-
8-benzoyl-1-bromoacetyl-6-ethoxy-
8-benzoyl-1-bromoacetyl-6-chloro- and
8-benzoyl-1-bromoacetyl-6-bromo-1,2,3,4-tetrahydroquinoline.

I claim:
1. The compound of the formula

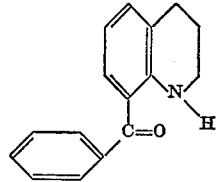

and its addition salts with pharmacologically acceptable acids.

References Cited

UNITED STATES PATENTS

| | | | |
|---|---|---|---|
| 2,605,208 | 7/1952 | Bartlett | 260—287 R |
| 3,651,083 | 3/1972 | Hester | 260—326.5 B |
| 3,642,820 | 2/1972 | Hester | 260—326.5 B |

DONALD G. DAUS, Primary Examiner

U.S. Cl. X.R.

260—289 R, 287 R

UNITED STATES PATENT OFFICE
CERTIFICATE OF CORRECTION

Patent No. 3,793,328  Dated February 19, 1974

Inventor(s) Jackson B. Hester, Jr.

It is certified that error appears in the above-identified patent and that said Letters Patent are hereby corrected as shown below:

Column 2, line 7, formula IV should appear as shown below instead of as shown in the patent:

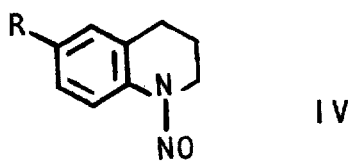

IV

Column 2, line 18, "$\frac{NaID_4}{Step\ 4}$" should read -- $\frac{NaIO_4}{Step\ 4}$ --; line 57, arrow from formula IIC to I should go from fromula IIb to I.
Column 3, line 35, "[3.2,1-" should read -- [3,2,1- --.
Column 4, line 63, "106.4" should read -- 106.5 --. Column 6, line 11 "40" should read -- 40% --.

Signed and sealed this 10th day of September 1974.

(SEAL)
Attest:

McCOY M. GIBSON, JR.
Attesting Officer

C. MARSHALL DANN
Commissioner of Patents